US012623414B2

(12) United States Patent
Tsunemasu et al.

(10) Patent No.:  US 12,623,414 B2
(45) Date of Patent:      May 12, 2026

(54) METHOD FOR PRODUCING COMPOSITE MATERIAL MOLDED ARTICLE, METHOD FOR PRODUCING RETAINER AND ROLLING BEARING, AND METHOD FOR PRODUCING GEARBOX CONSTITUENT COMPONENT

(71) Applicant: NSK LTD., Tokyo (JP)

(72) Inventors: Takuya Tsunemasu, Kanagawa (JP);
Tomoaki Matsumoto, Kanagawa (JP)

(73) Assignee: NSK LTD., Tokyo (JP)

( * ) Notice: Subject to any disclaimer, the term of this patent is extended or adjusted under 35 U.S.C. 154(b) by 296 days.

(21) Appl. No.: 18/290,393

(22) PCT Filed: May 13, 2022

(86) PCT No.: PCT/JP2022/020276

§ 371 (c)(1),
(2) Date: Nov. 13, 2023

(87) PCT Pub. No.: WO2022/239869

PCT Pub. Date: Nov. 17, 2022

(65) Prior Publication Data

US 2024/0269946 A1      Aug. 15, 2024

(30) Foreign Application Priority Data

May 14, 2021   (JP) ................................. 2021-082611
Apr. 22, 2022   (JP) ................................. 2022-071024

(51) Int. Cl.
*B29B 11/16*          (2006.01)
*B29B 13/06*          (2006.01)
(Continued)

(52) U.S. Cl.
CPC .............. *B29C 70/68* (2013.01); *B29B 11/16* (2013.01); *B29B 13/06* (2013.01); *B29C 43/003* (2013.01);
(Continued)

(58) Field of Classification Search
CPC ......... B29B 11/16; B29C 70/12; B29C 70/46; B29C 70/68
See application file for complete search history.

(56) References Cited

U.S. PATENT DOCUMENTS 3,047,442 A * 7/1962 Bozzacco ............... B29C 70/00
                                                                      428/428
3,235,530 A * 2/1966 Crouch ................... B29C 70/12
                                                                      523/216
(Continued)

FOREIGN PATENT DOCUMENTS

JP          57-69015 A      4/1982
JP          2002-86578 A      3/2002
(Continued)

OTHER PUBLICATIONS

International Search Report (PCT/ISA/210) dated Jul. 26, 2022, issued by the International Searching Authority in counterpart International Application No. PCT/JP2022/020276.
(Continued)

*Primary Examiner* — Andrew D Graham
(74) *Attorney, Agent, or Firm* — Sughrue Mion, PLLC

(57)                ABSTRACT

A method for producing a composite material molded article includes a process of, from a solution in which reinforcing fibers with an average fiber length of 0.5 mm or more and thermosetting resin are dispersed and mixed in a solvent, removing the solvent by paper-making to form a preform, and a process of press molding the obtained preform using a mold set at a temperature equal to or higher than a curing
(Continued)

temperature of the thermosetting resin to form the composite material molded article.

8 Claims, 14 Drawing Sheets

(51) Int. Cl.

| | |
|---|---|
| *B29C 43/00* | (2006.01) |
| *B29C 43/18* | (2006.01) |
| *B29C 70/12* | (2006.01) |
| *B29C 70/46* | (2006.01) |
| *B29C 70/68* | (2006.01) |
| *F16C 43/06* | (2006.01) |
| *B29K 101/10* | (2006.01) |
| *B29K 105/00* | (2006.01) |
| *B29L 15/00* | (2006.01) |
| *B29L 31/04* | (2006.01) |

(52) U.S. Cl.
CPC .............. *B29C 43/18* (2013.01); *B29C 70/12* (2013.01); *B29C 70/46* (2013.01); *F16C 43/065* (2013.01); *B29K 2101/10* (2013.01); *B29K 2105/251* (2013.01); *B29L 2015/00* (2013.01); *B29L 2031/04* (2013.01)

(56) References Cited

U.S. PATENT DOCUMENTS

| | | | |
|---|---|---|---|
| 10,093,066 B2 * | 10/2018 | Lim ................... D04H 1/43835 |
| 10,787,548 B2 | 9/2020 | Shinohara et al. | |
| 2003/0000641 A1 * | 1/2003 | Schmidt ................ B29C 66/721 | |
| | | | 156/307.3 |
| 2003/0124952 A1 * | 7/2003 | Marine .................. B29C 39/10 | |
| | | | 446/385 |
| 2011/0031660 A1 * | 2/2011 | Huff ........................ B29B 11/16 | |
| | | | 264/571 |
| 2012/0237754 A1 * | 9/2012 | Kasuga .................. B32B 5/245 | |
| | | | 156/307.3 |
| 2014/0262088 A1 * | 9/2014 | Deka .................... D04H 1/4242 | |
| | | | 162/146 |

| | | | |
|---|---|---|---|
| 2015/0144253 A1 * | 5/2015 | Zhang ..................... B32B 5/32 |
| | | | 156/167 |
| 2015/0145165 A1 * | 5/2015 | Zhang .................. B05C 11/021 |
| | | | 523/222 |
| 2015/0247025 A1 * | 9/2015 | Ichikawa .................. C08J 5/06 |
| | | | 427/398.1 |
| 2016/0244898 A1 * | 8/2016 | Kalbe ................... D04H 1/645 |
| 2018/0361682 A1 * | 12/2018 | Mortimer ............... B29B 15/12 |
| 2019/0160794 A1 * | 5/2019 | Bonte .................... B32B 27/38 |
| 2020/0198193 A1 * | 6/2020 | Suzuki ............. B29C 45/0025 |
| 2020/0198194 A1 * | 6/2020 | Suzuki ..................... B32B 5/28 |
| 2022/0177657 A1 * | 6/2022 | Koori ...................... C25D 5/02 |
| 2022/0402258 A1 * | 12/2022 | Shinohara .............. B29C 65/02 |

FOREIGN PATENT DOCUMENTS

| | | | |
|---|---|---|---|
| JP | 2005-193587 A | 7/2005 |
| JP | 2009-154339 A | 7/2009 |
| JP | 2009-298246 A | 12/2009 |
| JP | 2010-115853 A | 5/2010 |
| JP | 2012-20647 A | 2/2012 |
| JP | 2015-93479 A | 5/2015 |
| JP | 2015-135153 A | 7/2015 |
| JP | 2015-232382 A | 12/2015 |
| JP | 2016-121754 A | 7/2016 |
| JP | 2020-11465 A | 1/2020 |
| JP | 2020-28984 A | 2/2020 |
| JP | 2021-24172 A | 2/2021 |
| WO | 2018/056243 A1 | 3/2018 |

OTHER PUBLICATIONS

Written Opinion (PCT/ISA/237) dated Jul. 26, 2022, issued by the International Searching Authority in counterpart International Application No. PCT/JP2022/020276.

Office Action issued Oct. 4, 2022, issued by the Japan Patent Office in counterpart Japanese Patent Application No. 2022-554737.

Office Action issued Feb. 7, 2023, issued by the Japan Patent Office in counterpart Japanese Patent Application No. 2022-554737.

Office Action issued Apr. 25, 2023, issued by the Japan Patent Office in counterpart Japanese Patent Application No. 2022-554737.

Extended European Search Report issued Nov. 25, 2024 by the European Patent Office in European Patent Application No. 22807567. 7.

* cited by examiner

29

29a

80a

95

80b

93

91

80b

80a

1

METHOD FOR PRODUCING COMPOSITE MATERIAL MOLDED ARTICLE, METHOD FOR PRODUCING RETAINER AND ROLLING BEARING, AND METHOD FOR PRODUCING GEARBOX CONSTITUENT COMPONENT

CROSS-REFERENCE TO RELATED APPLICATIONS

This application is a National Phase Entry of PCT International Application No. PCT/JP2022/020276 filed on May 13, 2022, which claims priority to Japanese Patent Application No. 2021-082611 filed on May 14, 2021, and Japanese Patent Application No. 2022-071024 filed on Apr. 22, 2022, the contents of all of which are incorporated herein by reference in their entirety.

TECHNICAL FIELD

The present disclosure relates to a method for producing a composite material molded article, a method for producing a retainer and a rolling bearing, and a method for producing a gear box component.

BACKGROUND ART

Generally, cylindrical roller bearings, angular ball bearings, and the like are used as bearings for a main shaft of a machine tool. For retainers of such bearings, retainers made by cutting phenol resin reinforced with cotton cloth, and so-called plastic retainer (synthetic resin retainer) made of 66 nylon resin reinforced with glass fibers or carbon fibers, polyphenylene sulfide resin, polyetheretherketone resin, and the like, are used. The plastic retainers are advantageous for high speed rotation because plastic retainers have characteristics of being lightweight, having small centrifugal force during rotation, and having excellent self-lubrication.

For example, Patent Literature 1 proposes a method of reinforcing the rigidity of a retainer by forming a retainer main body of the retainer from a compression molded body of a resin material and integrally molding metal ring plates on both end surfaces of the retainer main body. Patent Literature 2 proposes a method of molding a high strength, high rigidity retainer by impregnating and coating a carbon fiber woven fabric with thermosetting resin and compressing the fabric in an annular axial direction.

An electric power steering device is known that transfers auxiliary output from an electric motor to a steering mechanism of a vehicle via a reduction gear mechanism. A gear box that houses the reduction gear mechanism of the electric power steering device includes gear box components such as a gear box and a cover, and such components are generally molded of metal such as an aluminum alloy.

In recent years, there has been a demand for improved fuel efficiency of automobiles to save resources, save energy, and reduce $CO_2$ emissions, and electric power steering devices are also required to be even lighter. Therefore, efforts have been made to reduce the weight of gear boxes for electric power steering devices, but to achieve such goal, the materials and structures that form the devices had to be significantly changed.

For example, it is conceivable to form a metal gear box from a resin material with a smaller specific gravity, but the resin material has lower impact resistance, creep properties, and rigidity than the metal material, and it is difficult to ensure the same quality as the related-art articles by simply changing the material to the resin material. In the resin structure, it is not easy to ensure dimensional stability equivalent to that of the metal structure.

Under such circumstances, examples in which a gear box (housing) of an electric power steering device is made of a resin material are disclosed in Patent Literatures 3 and 4. In the electric power steering device of Patent Literature 3, the housing is entirely made of resin material. In the electric power steering device disclosed in Patent Literature 4, a housing made of a resin material is coated with a metal plating film. Accordingly, it is aimed to achieve weight reduction while keeping characteristics equivalent to those of a metal housing.

CITATION LIST

Patent Literature

Patent Literature 1: JP2015-232382A
Patent Literature 2: JP2015-135153A
Patent Literature 3: JP2009-298246A
Patent Literature 4: JP2012-20647A

SUMMARY OF INVENTION

Technical Problem

In recent years, there has been an increasing demand for machine tools with improved cutting capabilities and short machining time, which resulted in a noticeable tendency to increase the rotational speed of the main shaft. Therefore, in rolling bearings that support the main shaft rotating at high speed, when the centrifugal force exerted on the retainer increases and the retainer is used under severe conditions, there is a risk that the retainer may deform and come into contact with the outer ring, causing wear, or that the retainer may break due to high hoop stress.

In Patent Literature 3 discussed above, the sensor housing and the gear housing are entirely formed of a polyamide resin material or polyamide resin filled with reinforcing fibers, and are integrated by laser welding. Therefore, to laser weld both, it is necessary to lower the fiber content, making it difficult to maintain physical properties such as high temperature strength, impact resistance, creep properties, and rigidity over a long period of time. Regarding the method of coating the housing with the metal plating film in Patent Literature 4, although the effect of preventing environmental deterioration of the material and preventing a decrease in the strength of the housing can be obtained, the strength of the resin material itself does not improve, so there is a possibility that sufficient strength cannot be ensured.

As described above, problems still remain when producing composite material molded articles using reinforcing fibers.

The present disclosure has been made to solve the problem mentioned above, and a first object of the present disclosure is to provide a method for producing a composite material molded article, which is capable of improving the strength and dimensional stability of a composite material molded article containing reinforcing fibers and resin.

A second object of the present disclosure is to provide a method for producing a retainer and a rolling bearing that maintains a good lubrication state, has high reliability, and can achieve a long life even when used in a high speed rotation environment.

A third object of the present disclosure is to provide a method for producing gear box components that are lightweight and that provide durability and reliability equivalent to those made of metal.

Solution to Problem

The present disclosure has the following configuration.
(1) A method for producing a composite material molded article, including processes of:
from a solution in which reinforcing fibers with an average fiber length of 0.5 mm or more and thermosetting resin are dispersed and mixed in a solvent, removing the solvent by paper-making to form a preform; and
press molding the obtained preform using a mold set at a temperature equal to or higher than a curing temperature of the thermosetting resin to form the composite material molded article.
(2) A method for producing a retainer, including producing a retainer for use in a rolling bearing by the method according to (1).
(3) A method for producing a rolling bearing, including producing a rolling bearing using the retainer produced by the method according to (2).
(4) A method for producing a gear box component, including producing a gear box component forming a gear box that houses a gear mechanism by the method according to (1).

Advantageous Effects of Invention

According to the present disclosure, it is possible to enhance the strength and dimensional stability of a composite material molded article containing reinforcing fibers and resin.

4

Figure 11A:
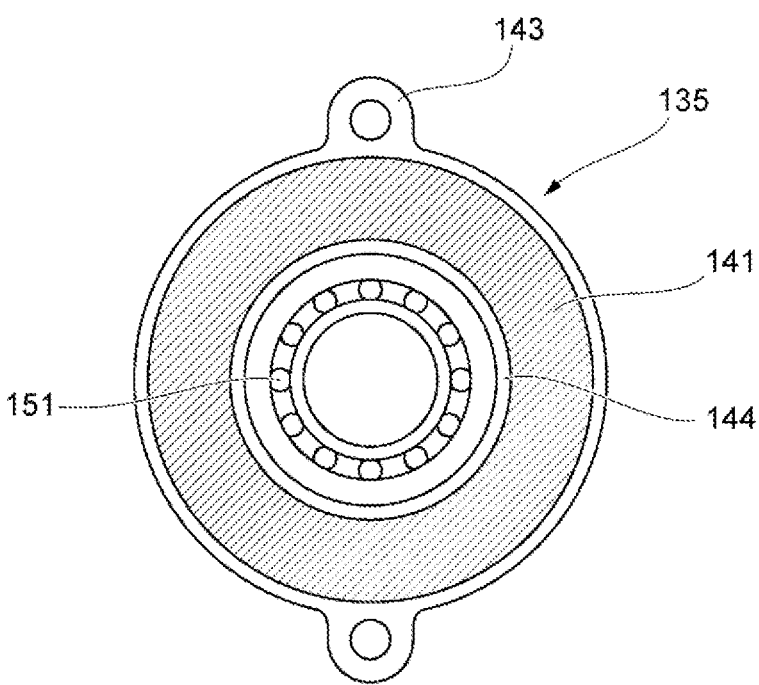
Figure 11B:
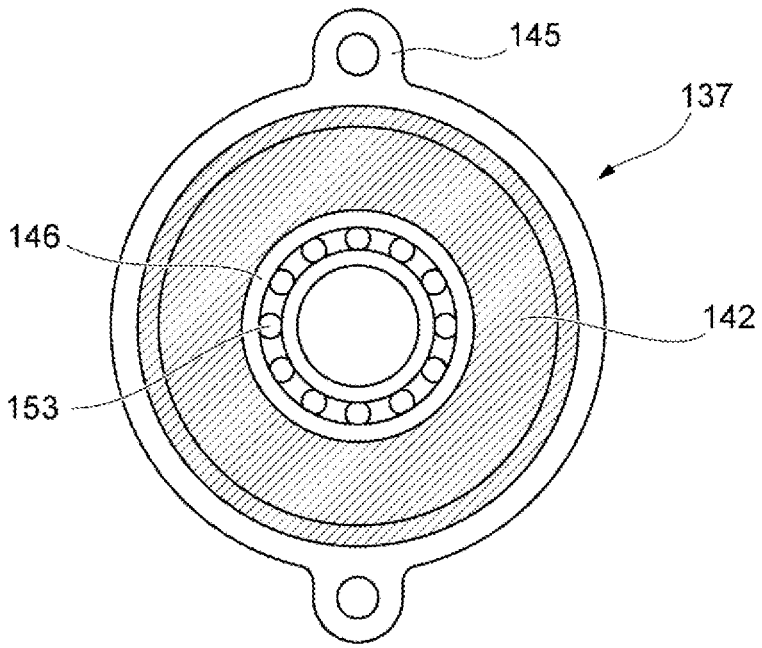
Figure 12A:
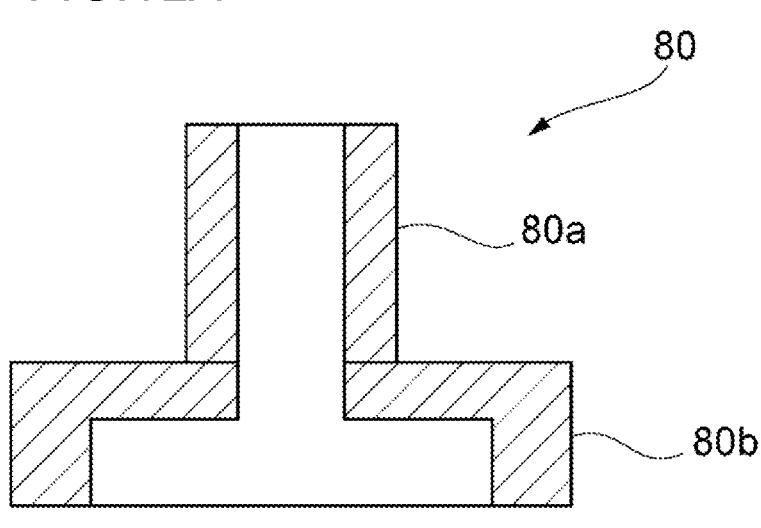
Figure 12B:
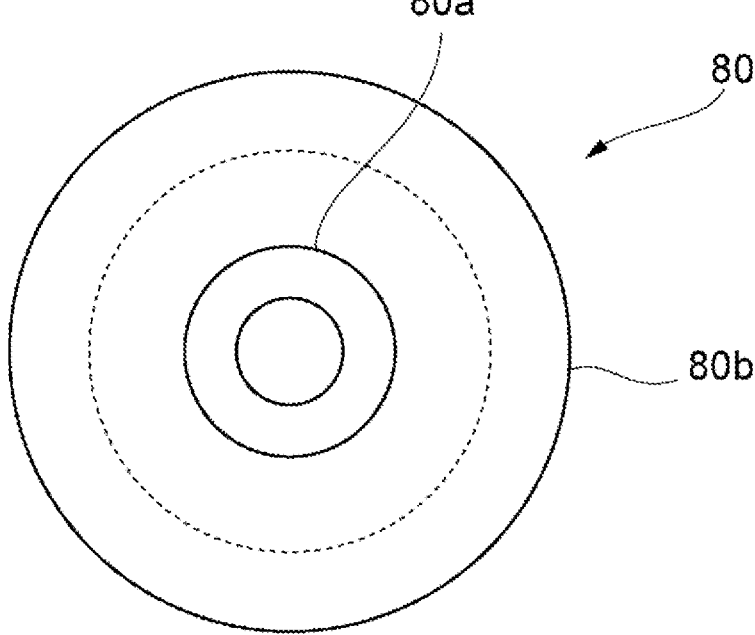
Figure 13A:
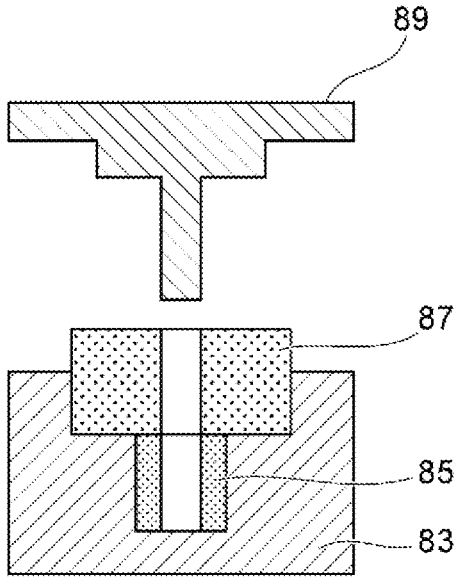
Figure 13B:
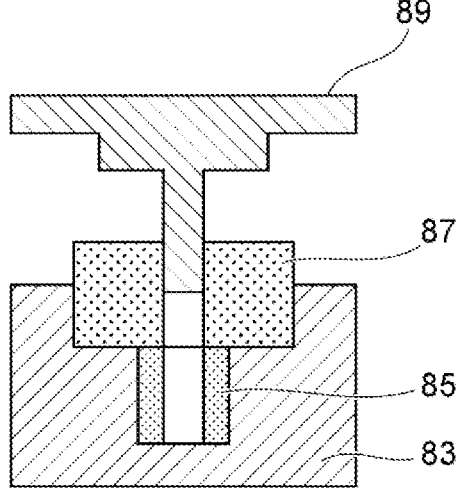
Figure 13C:
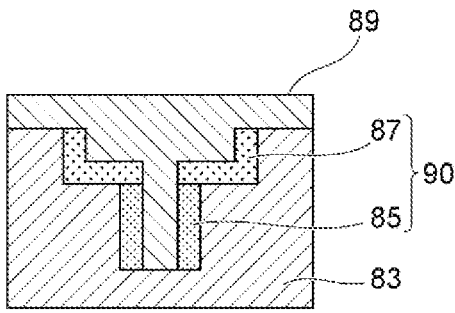
Figure 14A:
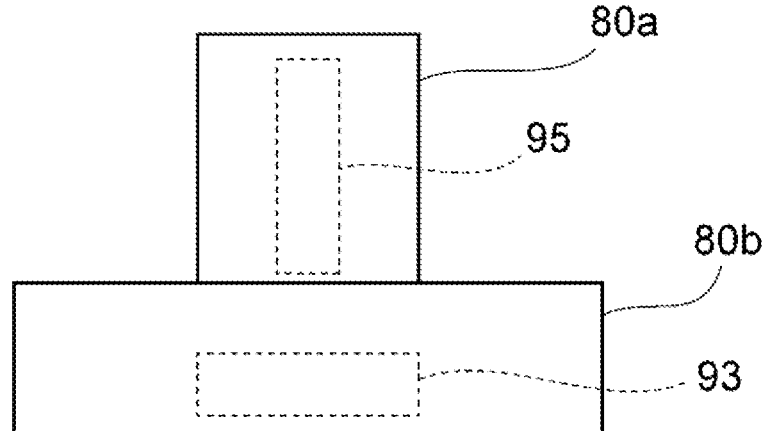
Figure 14B:
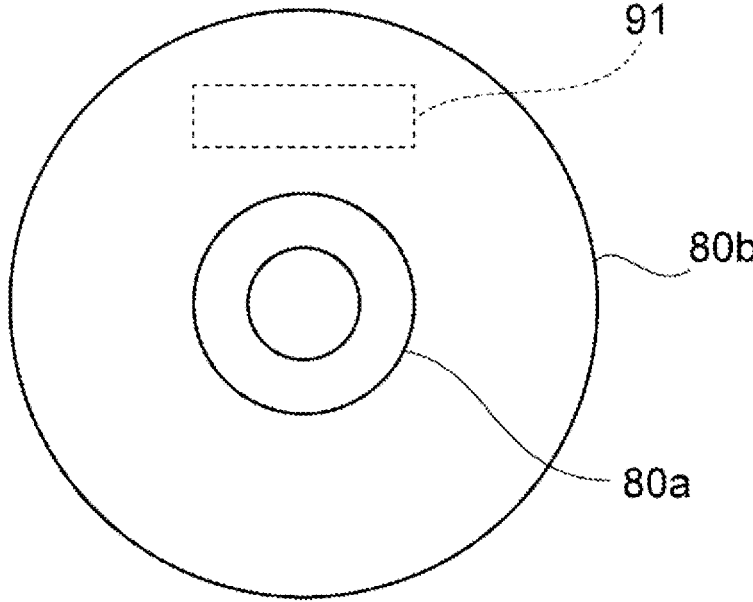

FIG. 11A is a plan view showing a gear box main body as one unit including a core metal.
FIG. 11B is a plan view showing a gear box cover as one unit including a core metal.
FIG. 12A is a configuration diagram of a molded article having a shape imitating a gear box cover, and is an axial cross-sectional view of the molded article.
FIG. 12B is a configuration diagram of the molded article having a shape imitating a gear box cover, and is a plan view of the molded article.
FIG. 13A is a process explanatory diagram showing a processing process of an integrated preform.
FIG. 13B is a process explanatory diagram showing the processing process of the integrated preform.
FIG. 13C is a process explanatory diagram showing the processing process of the integrated preform.
FIG. 14A is an explanatory view showing locations where test pieces are cut out from the molded article, and is a side view of the molded article.
FIG. 14B is an explanatory view showing a location where a test piece is cut out from the molded article, and is a plan view of the molded article.

DESCRIPTION OF EMBODIMENTS

Hereinafter, embodiments of the present disclosure will be described in detail with reference to the drawings. In the following description, a retainer of a rolling bearing and a gear box component will be described as examples of composite material molded articles, but the composite material molded articles are not limited thereto, and may be molded articles having a cylindrical shape, an annular shape, or the like.

First Configuration Example

Figure 1:
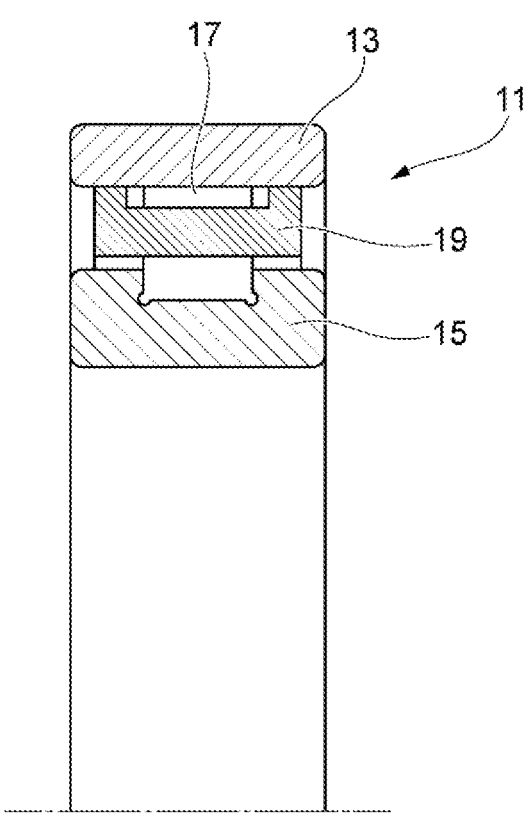
FIG. 1 is a partial cross-sectional view of a roller bearing.
Figure 2:
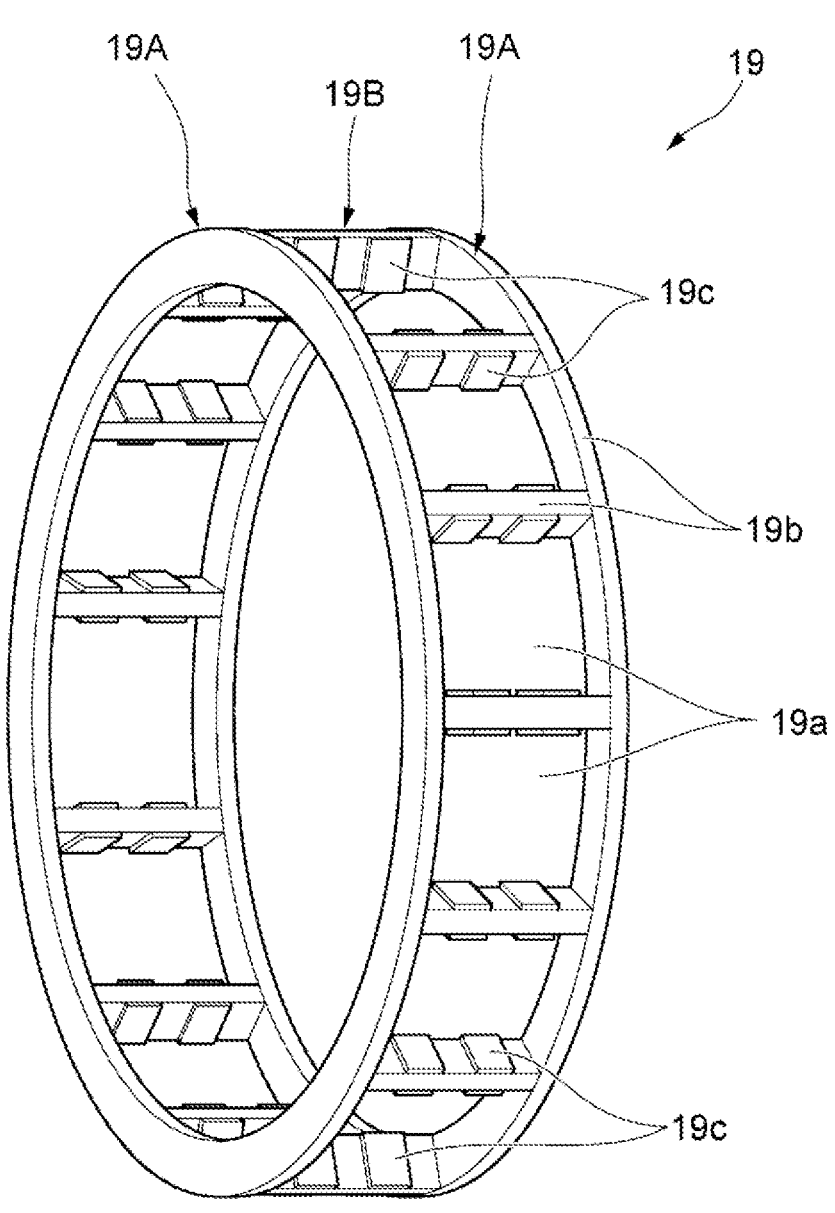
FIG. 2 is a perspective view of a retainer for use in the roller bearing shown in FIG. 1.

FIGS. 1 to 4 show examples of retainers and rolling bearings produced by a method for producing retainer and rolling bearing. FIG. 1 is a partial cross-sectional view of a roller bearing, and FIG. 2 is a perspective view of a retainer for use in the roller bearing shown in FIG. 1.

A roller bearing 11 shown in FIG. 1 as an example of a rolling bearing is a cylindrical roller bearing that includes an outer ring 13, an inner ring 15, a plurality of rolling elements 17, and a retainer 19. The retainer 19 is an outer ring guide type, and is set such that the retainer 19 is rotationally guided by the inner diameter surface of the outer ring 13. The roller bearing 11 described above is also applied to support a main shaft rotating at high speed, for example, a main shaft of a machine tool.

As shown in FIG. 2, the retainer 19 includes a pair of annular portions 19A that face each other in the axial direction, and a plurality of columnar portions 19B that connect the pair of annular portions 19A. Regions surrounded by a pair of columnar portions 19B arranged to face each other in the circumferential direction and a pair of annular portions 19A facing each other in the axial direction become a plurality of rectangular pockets 19a in which the rolling elements 17 are housed. Each of the pockets 19a rotatably holds the rolling elements 17 disposed in the pockets 19a, respectively. Note that a plurality of fine irregularities may be randomly formed on a guide surface 19b (surface facing the outer radial direction) of the retainer 19 and a surface 19c (surface facing the circumferential direction) that is in sliding contact with the rolling elements 17. Such fine irregularities can be formed by various known methods. For example, by forming a desired irregularity shape on the molding surface of a mold during molding, the irregularities may be obtained by transfer from the mold during molding. Such irregularities reduce damage to the inner diameter surface of the outer ring when the bearing slides into contact with the inner diameter surface of the outer ring during high speed rotation.

The rolling bearing is not limited to the roller bearing described above, and may be of other types such as a ball bearing.

Figure 3:
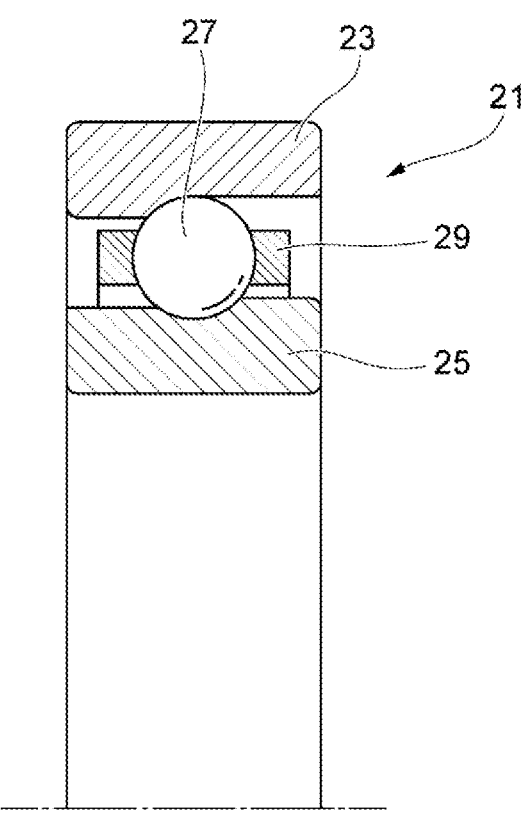
FIG. 3 is a partial cross-sectional view of a ball bearing.
Figure 4:
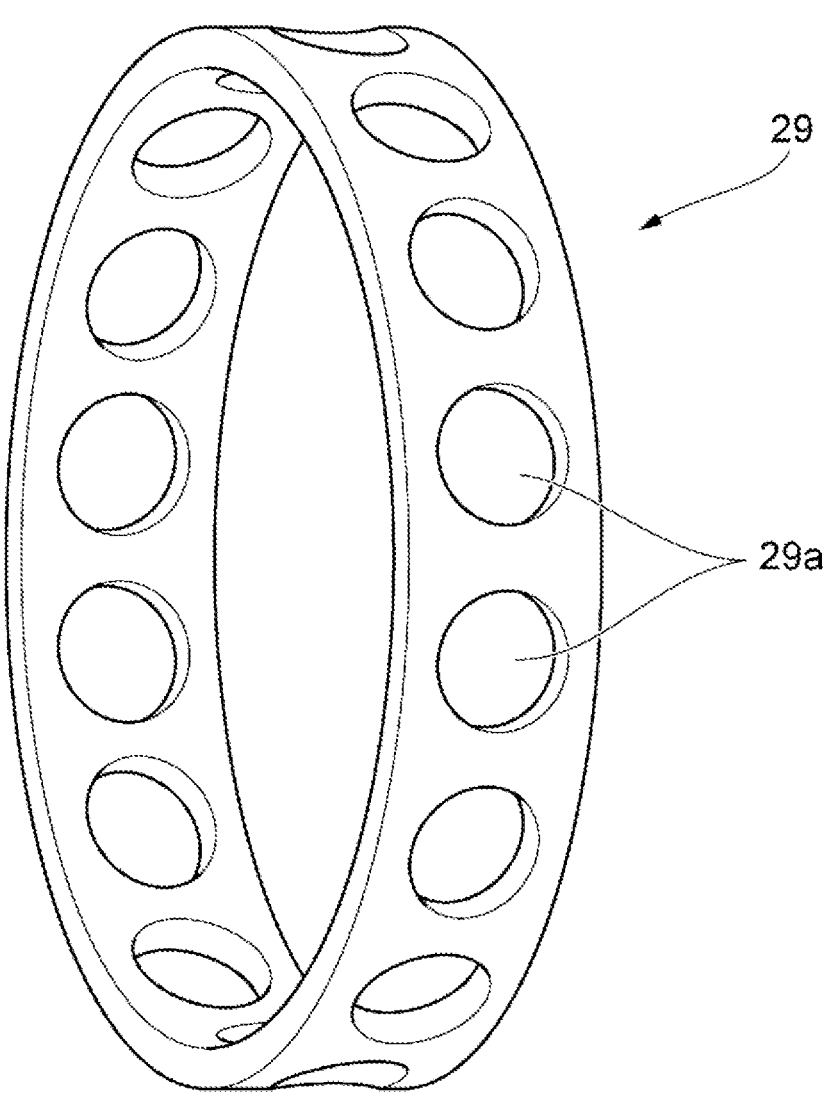
FIG. 4 is a perspective view of a retainer for use in the ball bearing of FIG. 3.

FIG. 3 is a partial cross-sectional view of the ball bearing, and FIG. 4 is a perspective view of a retainer for use in the ball bearing of FIG. 3.

A ball bearing 21 shown as another example of the rolling bearing is an angular ball bearing that includes an outer ring 23, an inner ring 25, a plurality of rolling elements 27, and a retainer 29. Here, like the roller bearing 11 shown in FIGS. 1 and 2, the retainer 29 includes a plurality of circular pockets 29a, and rotatably holds the rolling elements 27 disposed in the pockets 29a, respectively.

In the rolling bearings as described above, and especially in a high speed rotation environment, centrifugal force applied to the retainer increases, making it more easier for wear to occur from the contact between the retainer and the outer ring, and the retainer to be damaged due to hoop stress. Therefore, restrictions are imposed on the rotational speed that can be used.

Therefore, a method for producing a retainer and a rolling bearing of the present embodiment is provided to provide a bearing structure that is applicable to the high speed rotation described above, in which by press molding a preform including a resin retainer made through a paper-making process, it is possible to increase the strength, rigidity, and the like of the retainer and reduce wear and damage along with deformation caused by centrifugal force. As a result, even when the rolling bearing is used in a high speed rotation environment, reliability can be increased and a long life can be achieved while maintaining a good lubrication state. Hereinafter, the method for producing the retainer and the rolling bearing, which is capable of producing such a retainer and a rolling bearing will be described.

The method for producing the retainer for use in the rolling bearing mainly includes the following processes.

(1) Process of preparing a solution in which reinforcing fibers with an average fiber length of 0.5 mm or more and thermosetting resin are dispersed and mixed in a solvent.
  (2) Process of removing the solvent from the solution in (1) by paper-making to form a preform.
  (3) Process of press molding the preform obtained in (2) using a mold set at a temperature higher than the curing temperature of the thermosetting resin to mold a retainer.

Next, each of the processes described above will be described in detail.

Figure 5A:
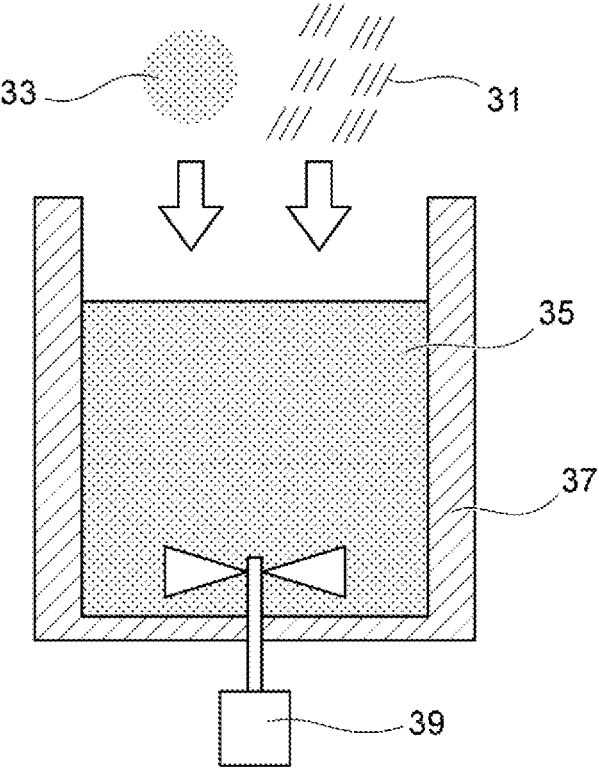
FIG. 5A is a process explanatory diagram of preparing a solution in which reinforcing fibers and thermosetting resin are dispersed and mixed in a solvent.
Figure 5B:
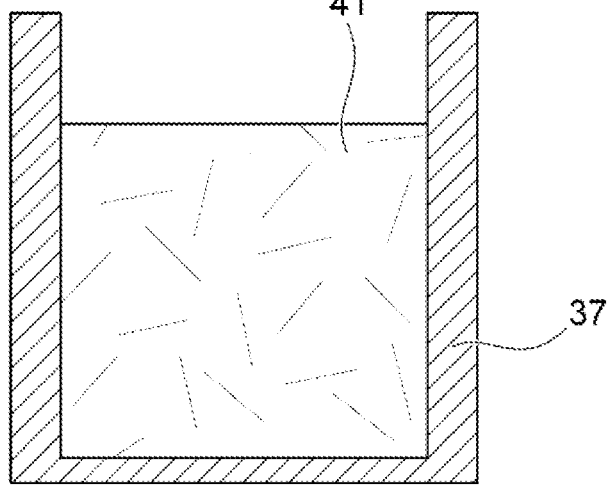
FIG. 5B is a process explanatory diagram showing a state before a stirrer is driven in the process of preparing a solution in which reinforcing fibers and thermosetting resin are dispersed and mixed in a solvent.

FIGS. 5A and 5B are process explanatory diagrams of preparing a solution in which reinforcing fibers and thermosetting resin are dispersed and mixed in a solvent.

As shown in FIG. 5A, for example, fillet-shaped reinforcing fibers 31 are put into a container 37 containing a solvent 35, and a stirrer 39 is driven. For example, powdered thermosetting resins 33 are put into the container 37, and then mixed and spread by the stirrer 39. As a result, as shown in FIG. 5B, the reinforcing fibers 31 are opened in the solvent 35, and the reinforcing fiber 31 and the thermosetting resin 33 are dispersed and mixed in the solvent to obtain a homogeneous fiber containing slurry solution 41. The solvent 35 is preferably water (white water) from the viewpoint of stability, ease of handling, and material cost, but may also be a solvent such as ethanol and methanol, or a mixture thereof.

The reinforcing fiber 31 is, for example, at least one selected from carbon fiber, aramid fiber, glass fiber, cellulose fiber, polyarylate fiber, and polyparaphenylene benzbisoxazal fiber. In particular, the carbon fibers and the glass fibers are preferred because of good reinforcing properties. It is also possible to use two or more types of reinforcing fibers from each of the fibers described above, and the reinforcing fibers are not particularly limited to certain type after the two types.

The average fiber length of the reinforcing fibers 31 to be introduced is preferably 0.5 mm or more, and more preferably, 1.0 mm or more. Accordingly, the reinforcing properties of the reinforcing fibers can be stably ensured.

The amount of the reinforcing fibers 31 in the solution 41 is preferably 10% by mass or more and 60% by mass or less, for example. When the amount is 10% by mass or more, the mechanical strength can be significantly improved, and when the amount is 60% by mass or less, the desired strength and rigidity can be ensured without impairing the toughness of the material.

The thermosetting resin 33 is made of at least one type of resin selected from, for example, epoxy resin, bismaleimide resin, polyaminoamide resin, polyimide resin, and phenol resin. The thermosetting resin 33 is preferably in powder form. When the thermosetting resin 33 is in powder form, the reinforcing fibers 31 and the thermosetting resin 33 can be sufficiently dispersed and mixed in the next paper-making process.

Next, from the solution 41 in which the reinforcing fibers 31 and the thermosetting resin 33 are dispersed and mixed, the solvent 35 is removed by paper-making to form a preform. That is, in FIG. 5B, after the reinforcing fibers 31 and the powder of the thermosetting resin 33 are sufficiently dispersed by stirring, a fixing agent is added and mixed. As a result, the reinforcing fibers 31 and the thermosetting resin 33 are adhered together. Thereafter, the solvent 35 is dehydrated (removed of liquid) and the resulting mixture is dried to obtain a preform. The type of fixing agent used herein is not particularly limited. The solvent 35 can be dehydrated (removed of liquid) using a known method such as natural dehydration using its own weight or compression.

Figure 6A:
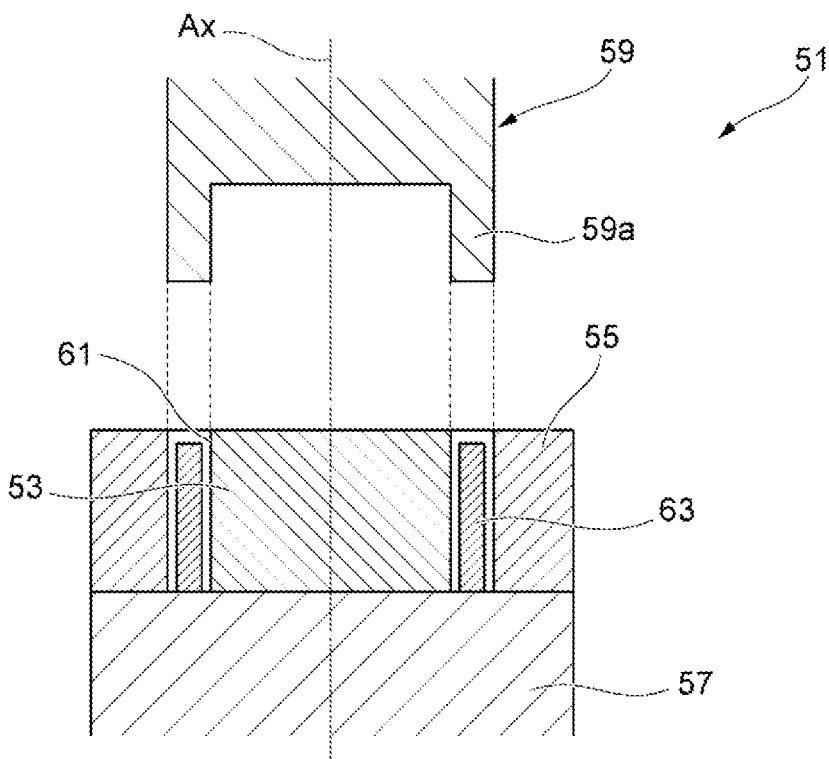
FIG. 6A is a process explanatory diagram showing a press molding process for molding the retainer.
Figure 6B:
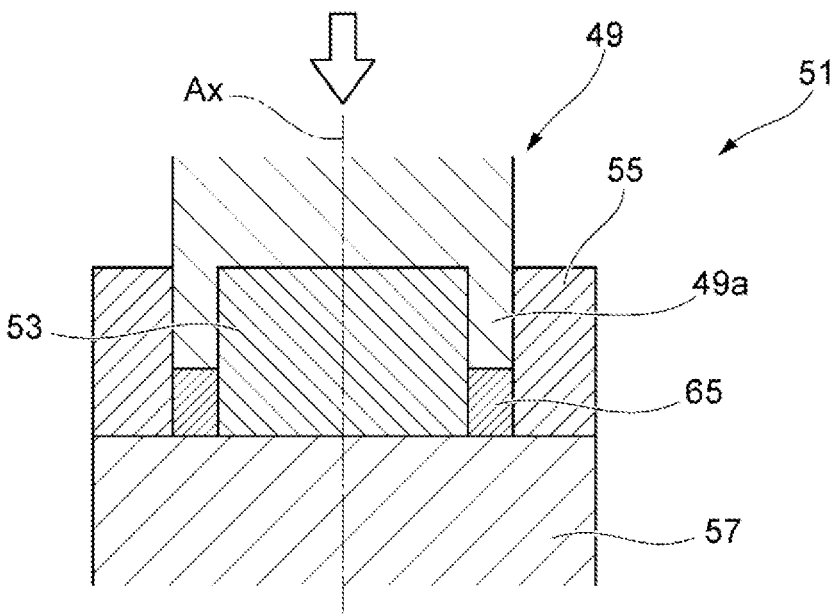
FIG. 6B is a process explanatory diagram showing the press molding process for molding the retainer.

Next, the obtained preform is press molded using a mold (hereinafter also referred to as a "mold" or "press mold") heated and kept at a temperature higher than the curing temperature of the thermosetting resin to obtain a retainer. FIGS. 6A and 6B are process explanatory diagrams showing a press molding process for molding a retainer.

A press mold 51 shown in FIG. 6A includes a cylindrical inner mold 53, a cylindrical outer mold 55, a base mold 57, and a movable mold 59. The movable mold 59 includes an annular protrusion 59a. The inner mold 53 and the outer mold 55 are arranged concentrically about a central axis Ax, with one side surface in contact with the base mold 57. Each of the inner mold 53 and the outer mold 55 is fixed to the base mold 57 with fasteners such as bolts. A cylindrical clearance portion 61 is formed between an outer circumferential surface of the inner mold 53 and an inner circumferential surface of the outer mold 55. A preform 63 is set in the clearance portion 61 of the press mold.

In the press mold 51 having the configuration described above, the outer circumferential surface of the inner mold 53 that defines the clearance portion 61 forms an inner diameter surface of the retainer, and the inner circumferential surface of the outer mold 55 forms an outer diameter surface of the retainer. The preform 63 is formed into an annular shape in the paper-making process before being placed in the press mold 51, and is placed in the clearance portion 61 which is an annular space larger than the annular shape of the preform 63.

In the molding process, it is preferable that the press mold 51 is preheated by a heater, and the like (not shown) provided therein. As a result, the thermosetting resin 33 contained in the preform 63 can be brought into an easily flowable state during the subsequent thermosetting treatment. Then, in the pressing process by the movable mold 59 shown in FIG. 6B that is moving (pressurizing), compressing is performed by applying pressure in the axial direction of the annular shape (direction of the central axis Ax) while constraining the inner diameter surface and the outer diameter surface of the preform 63.

More specifically, with the inner diameter surface of the preform 63 being constrained by the outer circumferential surface of the inner mold 53, and the outer diameter surface of the preform 63 being constrained by the inner circumferential surface of the outer mold 55, the movable mold 59 including the annular protrusion 59a fit in the clearance portion 61 is moved toward the base mold 57. Accordingly, the preform 63 is compressed in the direction of the central axis Ax.

Constraining herein refers to a state in which the preform 63, which is placed in light contact or placed with a gap with the mold before compression molding, is gradually compressed into close contact as the preform 63 is compressed by the movable mold 59. In the process, it is sufficient that the thermosetting resin 33 of the preform 63 placed in the mold is in a flowable state, and it does not matter whether the preform 63 is heated or melted before molding.

After pressurizing the movable mold 59 toward the base mold 57 and compression molding the preform 63, the preform 63 is heated within the press mold 51 to thermoset the thermosetting resin 33 contained in the preform 63. The heating of the preform 63 here is a process of heating the press mold 51 to a temperature equal to or higher than the thermosetting start temperature of the thermosetting resin 33. The thermosetting conditions for the thermosetting resin 33 may be appropriately set according to the type of resin of the preform 63 to be used. The press mold 51 may be heated while the preform 63 is compression molded, and the press molding and thermosetting treatment may be performed at the same time. Here, tact time can be shortened. A compression molded body 65 is obtained by the compression molding and heat treatment described above.

The thermosetting treatment described above may be a post-curing process for the purpose of preventing dimensional shrinkage and improving mechanical properties during actual use of the retainer. Generally, adding the post-cure process improves the fatigue properties, tensile strength, and chemical resistance of the molded article. The thermosetting treatment described above may include a process of placing the preform 63 in a cavity of the mold, and injecting liquid resin into the cavity to perform resin molding.

The compression molded body 65 after press molding and thermosetting treatment may be in the shape of the retainer, or the compression molded body 65 may be further machined into the shape of the retainer. For example, the pockets 19a, 29a (FIGS. 2 and 4), and the like of the retainers 19 and 29 can be formed by post-processing. Here, any means such as machining, laser processing, water cutting, and the like can be employed as the means for forming the pockets. A slide core or the like may be provided in the press mold 51 to form the pockets at the same time as the press molding.

The rolling bearings 11 and 21 shown in FIGS. 1 and 3 are assembled and produced using the retainer produced as described above.

According to the present embodiment, for a rolling bearing used in high speed rotation environment such as the main shaft of the machine tool, instead of the related-art fiber reinforced resin material, the retainer may be obtained by press molding and thermosetting treatment of a preform produced through a paper-making process. According to the method for producing the retainer, a retainer with high strength and high rigidity can be obtained, and a rolling bearing that can reduce damage to the retainer and achieve high reliability and long life can be obtained.

Next, a modification of the press molding process will be described.

Figure 7A:
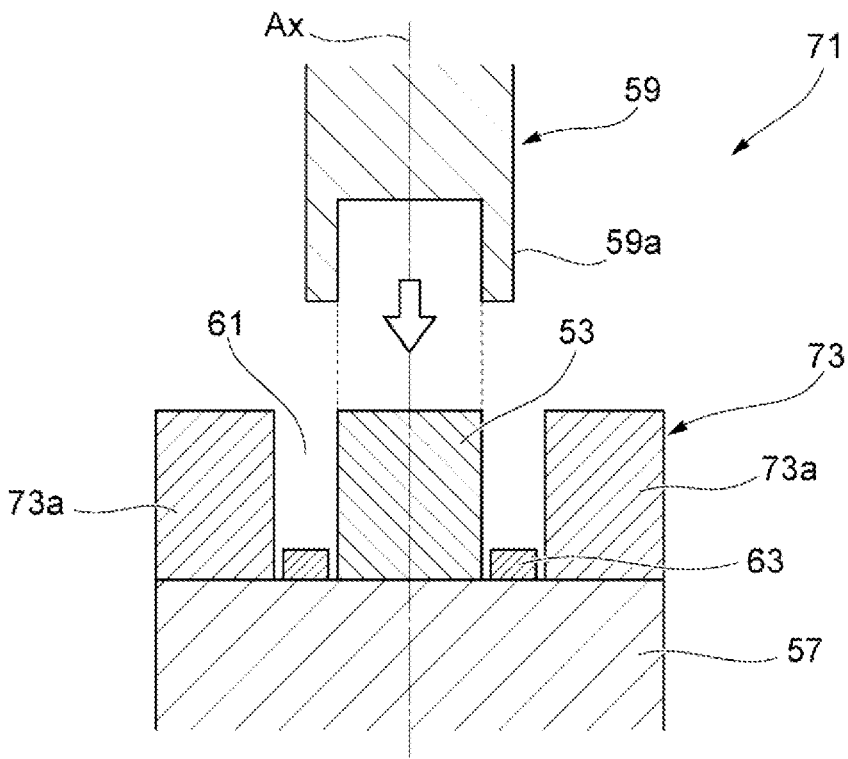
FIG. 7A is a process explanatory diagram showing another press molding process for molding the retainer.
Figure 7B:
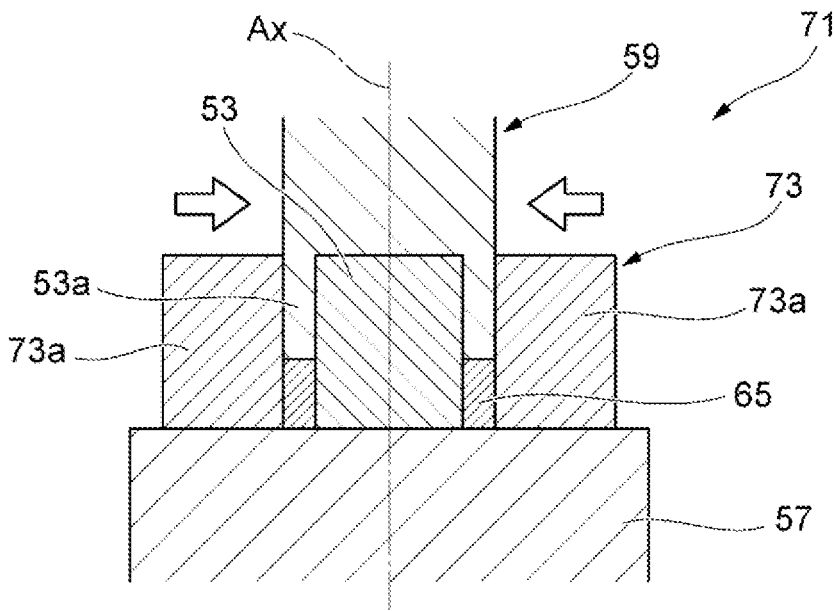
FIG. 7B is a process explanatory diagram showing another press molding process for molding the retainer.

FIGS. 7A and 7B are process explanatory diagrams showing another press molding process for molding the retainer.

A press mold 71 shown in FIG. 7A is similar to the press mold 51 described above, except that an outer mold 73 is divided into a plurality of blocks 73a along the circumferential direction of the inner mold 53, and that each of the blocks 73a is changed to a slide core structure that is movable in the radial direction around the central axis Ax. Each of the blocks 73a moves radially in a plan view seen from the central axis Ax direction.

In the press mold 71 having such configuration, the preform 63 is set in the cylindrical clearance portion 61 between the outer circumferential surface of the inner mold 53 and the inner circumferential surface of the outer mold 73. Then, the movable mold 59 is moved toward the base mold 57 by a drive mechanism (not shown) to fix the side surface of the preform 63. Then, as shown in FIG. 7B, the plurality of blocks 73a are moved radially inward by the drive mechanism (not shown) such that the preform 63 is press molded from the radially outer side toward the inner side. Although the press molding here is mainly performed by moving the plurality of blocks 73a in the radial direction, the press molding may also be performed by the movable mold 59 in cooperation with the press.

Also in the present configuration, it is preferable to preheat the press mold 71. After pressing the plurality of blocks 73a inward in the radial direction and compression molding the preform 63, the preform 63 is heated in the press mold 71, and the thermosetting resin 33 contained in the preform 63 is thermoset. As a result, the compression molded body 65 is obtained in the same manner as in the case described above.

According to the processes shown in FIGS. 7A and 7B, since the plurality of blocks 73a are moved in the radial direction, pockets (see FIGS. 2 and 4) in which the rolling elements are arranged can be easily formed by pressing. As a result, the number of processing steps can be reduced and the retainer can be produced efficiently.

Second Configuration Example

Next, a case in which the composite material molded article is a gear box component will be described. Here, the gear box component will be described as a component of a gear box used in an electric power steering device, but the gear box component is not limited thereto and may be a component used in other devices.

<Configuration of Electric Power Steering Device>

Figure 8:
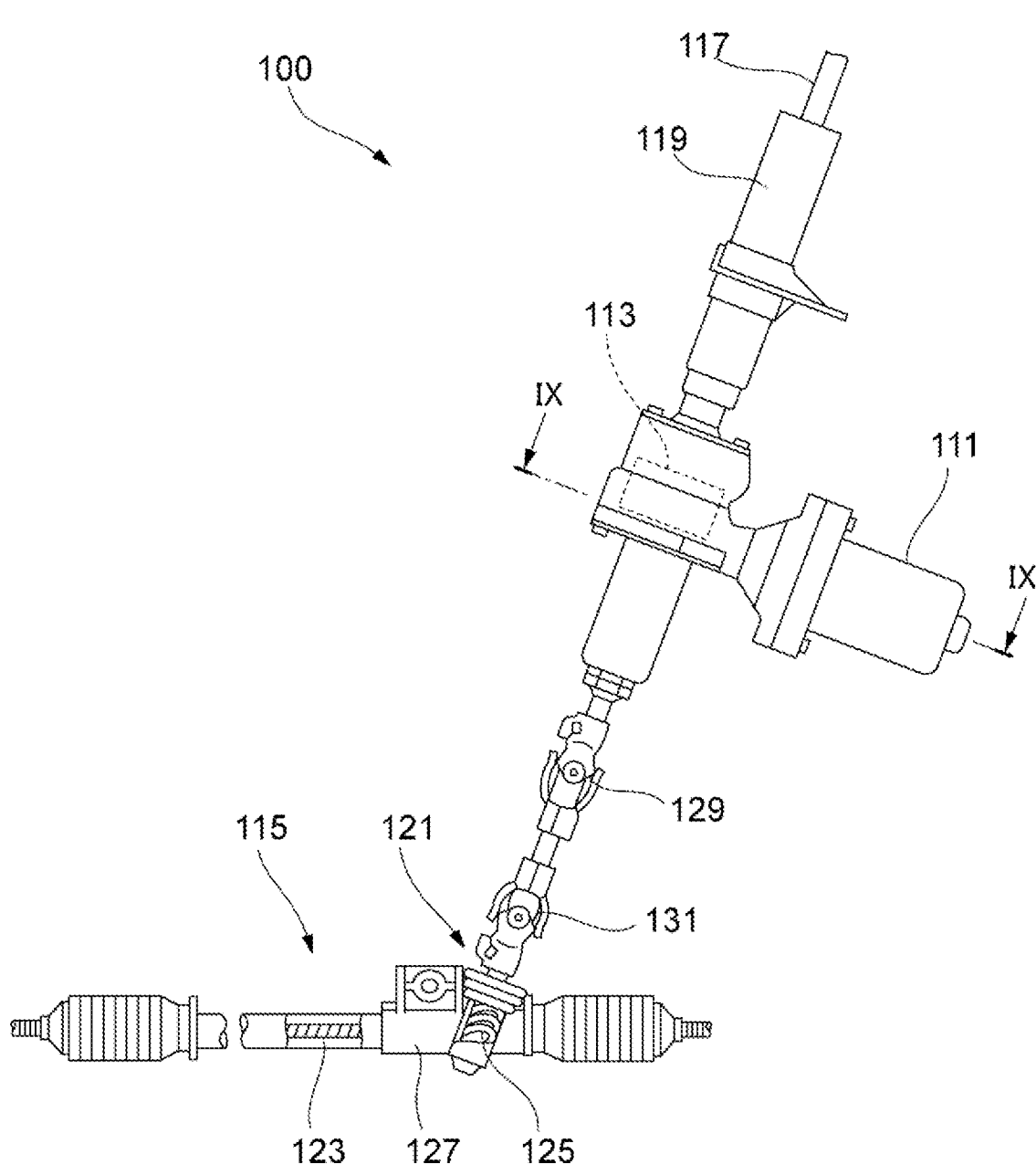
FIG. 8 is a schematic configuration diagram of an electric power steering device.

FIG. 8 is a schematic configuration diagram of the electric power steering device.

An electric power steering device 100 transfers auxiliary output from an electric motor 111 to a steering mechanism 115 of a vehicle via a reduction gear mechanism 113. Note that the illustrated electric power steering device 100 is merely an example, and other types of mechanisms may be used.

In the electric power steering device 100 shown in FIG. 8, a steering shaft 117 with a steering wheel (not shown) fixed to its upper end is rotatably supported inside a steering shaft housing 119. The steering shaft housing 119 is fixed at a predetermined position inside the vehicle interior with its lower portion inclined toward the front of the vehicle.

A rack and pinion mechanism 121 that converts the rotation of the steering shaft 117 into motion of the left and right steering wheels includes a rack 123 that is movable in the axial direction, a pinion shaft 125, and a cylindrical rack housing 127 that supports the rack 123 and the pinion shaft 125. The pinion shaft 125 is supported obliquely with respect to the axis of the rack 123 and includes a pinion provided with gear teeth that mesh with the gear teeth of the rack 123.

The rack and pinion mechanism 121 is disposed substantially horizontally in an engine room at the front of the vehicle, with its longitudinal direction along the width direction of the vehicle. An upper end of the pinion shaft 125 and a lower end of the steering shaft 117 are connected with two universal joints 129 and 131. Steering wheels (not shown) are connected to both ends of the rack 123.

When the driver applies steering torque (rotational force) to the steering wheel, the steering shaft 117 is rotated, and the steering torque is detected by a torque sensor (not shown) attached to the steering shaft 117. Then, the output of the electric motor 111 (rotational force that assists steering) is controlled based on the detected steering torque. The output of the electric motor 111 is supplied to the intermediate portion of the steering shaft 117 via the reduction gear mechanism 113, combined with the steering torque, and converted by the rack and pinion mechanism 121 into a motion for steering the steering wheels.

Figure 9:
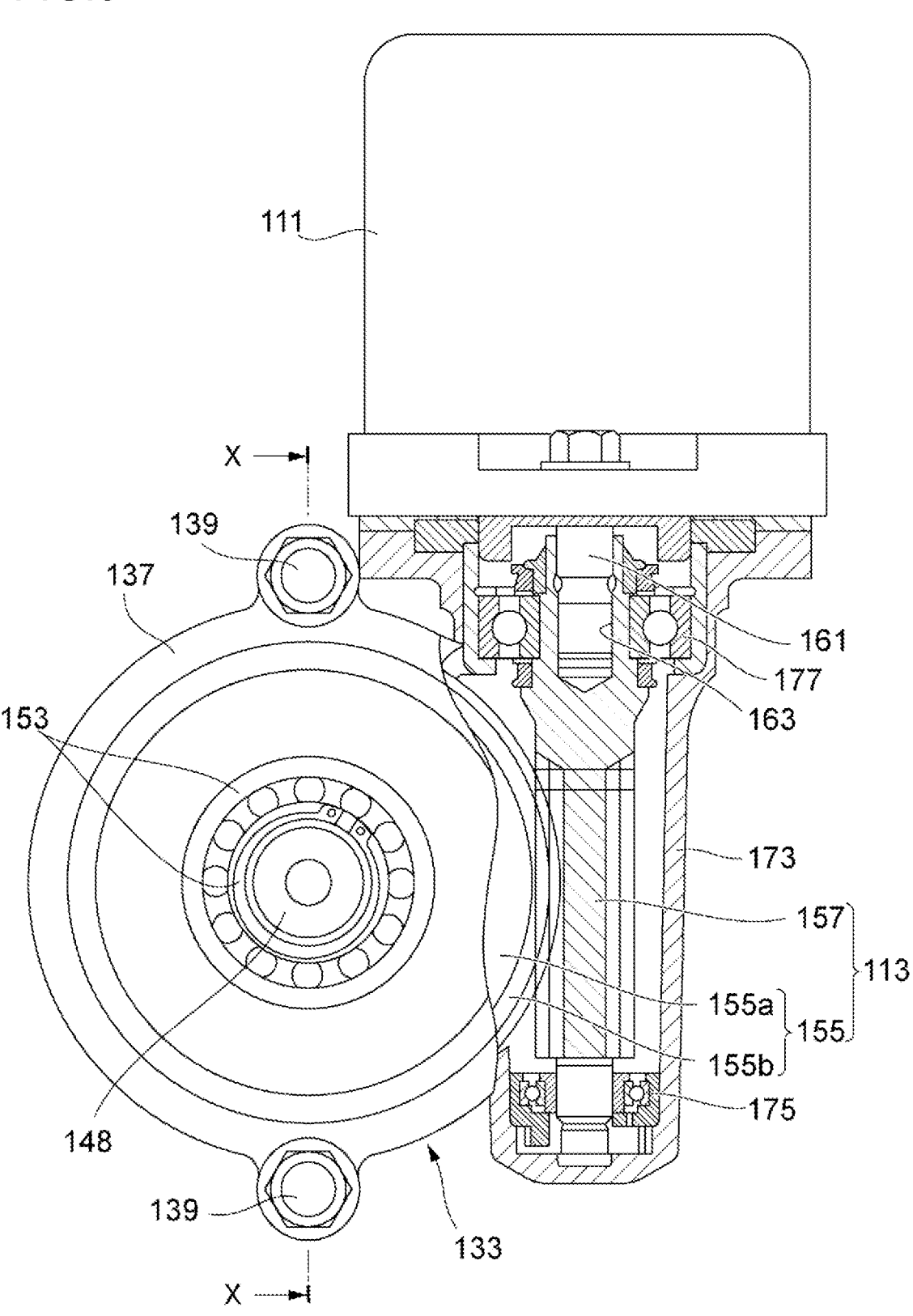
FIG. 9 is a partial cross-sectional view taken along line IX-IX shown in FIG. 8.
Figure 10:
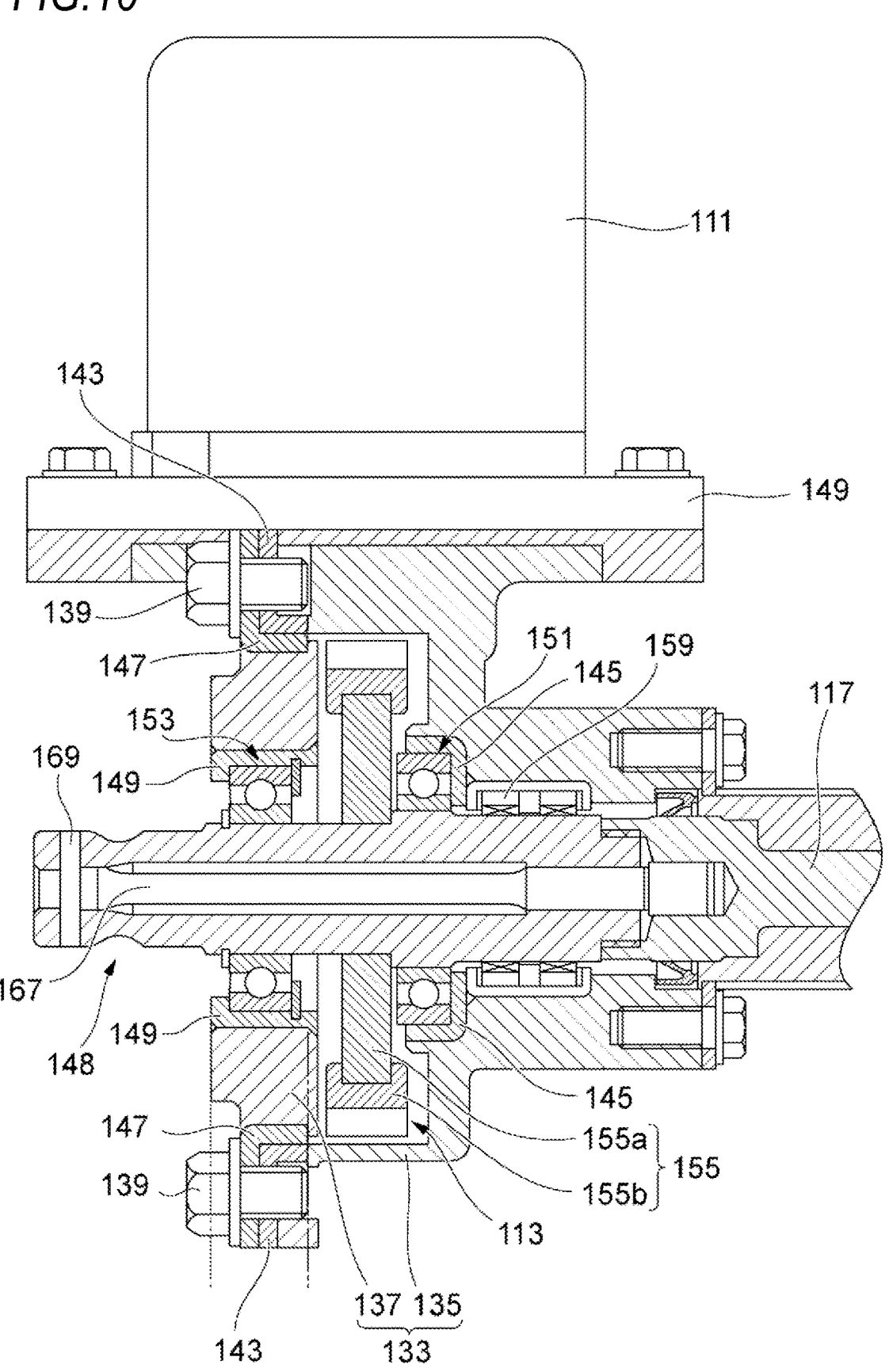
FIG. 10 is a partial cross-sectional view taken along line X-X shown in FIG. 9.

FIG. 9 is a partial cross-sectional view taken along a line IX-IX shown in FIG. 8, and FIG. 10 is a partial cross-sectional view taken along a line X-X shown in FIG. 9.

As shown in FIGS. 9 and 10, a gear box 133 that houses the reduction gear mechanism 113 of the electric power steering device 100 attached to the vehicle body (not shown) includes, as the gear box components, a cylindrical gear box main body 135 having a bottom and a gear box cover 137 shown in FIG. 10. The gear box cover 137 is fixed to the gear box main body 135 while covering an opening of the gear box main body 135. That is, bolts 139 are inserted into the opening provided on the gear box cover 137 side and fastened to screw holes provided on the gear box main body 135 side. As a result, the gear box 133 including the gear box main body 135 and the gear box cover 137 integrated by fastening the bolts 139 is obtained.

Inside the gear box 133, an intermediate steering shaft 148 is rotatably supported by a first rolling bearing 151 and a second rolling bearing 153. The reduction gear mechanism 113, and a torque sensor 159 as a steering state detection sensor are housed inside the gear box 133.

The reduction gear mechanism 113 includes a worm wheel 155 and a worm shaft 157 shown in FIG. 9. The worm wheel 155 is fixed to an axially intermediate portion of the intermediate steering shaft 148 shown in FIG. 10. The worm shaft 157 shown in FIG. 9 is connected to a rotating shaft 161 of the electric motor 111 via a spline joint 163, and meshes with the worm wheel 155.

As shown in FIG. 10, the worm wheel 155 includes a disk portion 155a rotatably fixed to the intermediate steering shaft 148, and synthetic resin teeth 155b formed on an outer diameter of the disk portion 155a. The intermediate steering shaft 148 is rotatably supported by the first rolling bearing 151 and the second rolling bearing 153 arranged on both sides of the worm wheel 155 in the axial direction.

A torsion bar 167 is disposed passing through the axial centers of the steering shaft 117 and the intermediate steering shaft 148, a left end thereof in the drawing is fixed integrally with the intermediate steering shaft 148 by a connecting pin 169, and a right end thereof in the drawing is press-fit and fixed to the steering shaft 117.

Therefore, the rotational force (steering torque) of the steering shaft 117 is transferred to the intermediate steering shaft 148 via the torsion bar 167.

As shown in FIG. 9, the worm shaft 157 that meshes with the worm wheel 155 is rotatably supported by a third rolling bearing 175 and a fourth rolling bearing 177 held by a gear housing 173. A proximal end of the worm shaft 157 is connected to the rotating shaft 161 of the electric motor 111 via the spline joint 163.

<Gear Box Component>

Next, the gear box 133 described above will be described in detail.

(Structure of Gear Box)

As shown in FIG. 10, the gear box 133 includes a plurality of gear box components including the gear box main body 135 and the gear box cover 137. Each of the gear box main body 135 and the gear box cover 137 is mainly configured to include a resin composition portion in which long fiber reinforcing fibers (fibrous filler) are dispersed in a resin material. The reinforcing fibers are contained in the resin material in a predetermined proportion according to the purpose of use. As a result, impact resistance, creep properties, rigidity, and dimensional stability are improved compared to when the gear box 133 is molded from a single resin material.

Although the illustrated gear box 133 includes two portions, that is, the gear box main body 135 and the gear box cover 137, the present disclosure is not limited thereto, and other portions may be further combined. Then, the other components may be a resin material containing the long fiber fibrous filler described above.

The gear box main body 135 made of resin containing reinforcing fibers and the gear box cover 137 are integrated with each other by fastening with the bolts 139 to form the gear box 133. The fastening portion between the gear box main body 135 and the gear box cover 137 by the bolts 139 may be configured to insert-mold a core metal 143 on the side of the gear box main body 135 made of metal and a core metal 147 on the side of the gear box cover 137 made of metal, thereby fastening the embedded core metals 143 and 147 to each other. The gear box main body 135 may be configured to include a core metal 145 that fixes the first rolling bearing 151, and the gear box cover 137 may be configured to include a core metal 149 that fixes the second rolling bearing 153. Since the gear box 133 of the present configuration includes a resin composition portion, it is lighter than a related-art article made entirely of metal, and also has durability and reliability equivalent to that of the related-art article.

It is preferable to provide an O-ring groove and an O-ring mounted in the O-ring groove (not shown) on a joint surface where the gear box main body 135 and the gear box cover 137 are fastened with bolts, thereby preventing the grease sealed in the gear box 133 from leaking.

Examples of the gear box main body 135 and gear box cover 137 including the core metals have structures schematically shown in FIGS. 11A and 11B.

FIG. 11A is a plan view showing the gear box main body 135 as one unit including the core metal, and FIG. 11B is a plan view showing the gear box cover 137 as one unit including the core metal.

The gear box main body 135 shown in FIG. 11A is provided with, integrally with a resin composition portion 141, the core metal 143 that is a fastening portion to the gear box cover 137 and a core metal 144 that is fit with the first rolling bearing 151. The gear box cover 137 shown in FIG. 11B is provided with, integrally with a resin composition portion 142, the core metal 145 that is a fastening portion to the gear box main body 135 and a core metal 146 that is fit with the second rolling bearing 153. The core metals 143, 144, 145, and 146 are integrally molded with the resin composition portions 141 and 142 as insert materials.

The gear box main body 135 and the gear box cover 137 (hereinafter also referred to as gear box components) having the configuration described above are schematically produced as follows.

First, reinforcing fibers having an average fiber length of 0.5 mm or more are opened in a solvent. For example, water can be used as the solvent. The reinforcing fibers and the resin (powder or fiber) described above are dispersed and mixed in the solvent to obtain a fiber containing slurry. This fiber containing slurry is dehydrated using a sheet- or paper-making mold to remove water (dry) and form a preform. Here, a plurality of types of preforms (details will be described below) with different bulk densities of reinforcing fibers are prepared. The preform formed here is a reference density preform, and the reference density preform is further compression molded to obtain a high density preform. The preforms formed in each bulk density are set in a mold, and heated and cured if the resin dispersed and mixed in the preform is the thermosetting resin. The temperature at which the thermosetting resin is heated is not particularly limited, but may be appropriately selected within a temperature range at which impregnation and melting of the resin serving as the base material proceeds sufficiently and does not cause deterioration. As a result, a gear box component based on a fiber reinforced resin composition is obtained.

(Constituent Materials of Gear Box Component)

As the constituent materials of the gear box component, for example, it is preferable to use a material obtained by mixing thermosetting resin such as epoxy resin or phenol resin as a resin material with a reinforcing fiber such as glass fiber or carbon fiber as a fibrous filler. A portion of the thermosetting resin may be replaced with thermoplastic resin. By using thermosetting resin as the constituent material, a structure with excellent heat resistance and mechanical strength can be obtained.

Considering durability and reliability as a molded article, it is desirable to use a fiber reinforced resin composition that includes thermosetting resin as base resin and reinforcing fibers filled in the base resin.

Using the fiber reinforced resin composition, it is possible to ensure the necessary and sufficient impact resistance performance of gear box components.

Examples of the reinforcing fibers may include, but are not limited to, glass fibers, carbon fibers, metal fibers, aramid fibers, aromatic polyimide fibers, liquid crystal polyester fibers, silicon carbide fibers, alumina fibers, boron fibers, cellulose, cellulose nanofibers, and the like.

In particular, the glass fibers and the boron fibers are preferred because of high tensile strength. The carbon fiber has excellent abrasion resistance, heat resistance, thermal elasticity, acid resistance, and electrical conductivity. For the metal fiber, metal threads of stainless steel, aluminum, iron, nickel, copper, and the like can be used. The aramid fibers have strong tensile strength and friction resistance and is also excellent in high temperature and chemical resistance. The aromatic polyamide fibers have excellent heat resistance and strength. Liquid crystal polyester fibers have a rigidity that exceeds that of filler-reinforced engineering plastics even in the unreinforced state. The alumina fibers can be used even in high temperature ranges and have fire resistance.

The reinforcing fibers preferably have an average fiber length of 0.5 mm or more, more preferably 0.7 mm or more, and still more preferably 1 mm or more. When fibers with an average fiber length of 0.5 mm or more are added, the effect of improving impact resistance and dimensional stability is greater than when fibers with an average fiber length of less than 0.5 mm are added. Therefore, by setting the average fiber length to 0.5 mm or greater, the reinforcing effect of the resin material in the composite material may be reliably obtained.

The amount of reinforcing fibers in the fiber reinforced resin composition is preferably 10 to 60% by mass. When the amount of reinforcing fibers in the fiber reinforced resin composition is 10% by mass or more, higher durability than the related-art articles may be obtained. When the amount of reinforcing fibers is 60% by mass or less, the toughness of the material is not impaired, and, for example, cold shock resistance is sufficient.

In the fiber reinforced resin composition, the affinity between the resin material and the reinforcing fibers can be improved by treating the reinforcing fibers with a coupling agent such as a silane coupling agent or a titanate coupling agent. As a result, it possible to improve the adhesion and dispersibility between the resin material and the reinforcing fibers. Note that the coupling agent is not limited to the silane coupling agent or the titanate coupling agent.

Various additives may be added to the fiber reinforced resin composition within a range that does not impair the purpose of the present disclosure. Examples of the additive may include solid lubricants such as graphite, hexagonal boron nitride, fluorinated mica, tetrafluoroethylene resin powder, tungsten disulfide, and molybdenum disulfide, inorganic powders, organic powders, lubricating oils, plasticizer, rubber, antioxidant material, heat stabilizer, ultraviolet absorber, photoprotectant, flame retardant, antistatic agent, mold release agent, fluidity improver, thermal conductivity improver, non-tackifying agent, crystallization accelerator, nucleating agent, pigment, dye agent, and the like.

(Specific Molding Procedure for Gear Box Component)

When producing the gear box components by mixing the resin materials, the reinforcing fibers, and various additives described above, a plurality of types of preforms with different bulk densities of reinforcing fibers having an average fiber length of 0.5 mm or more are integrally molded with a resin material and an insert material by press molding.

For the preforms described above, a reference density preform formed with a reference bulk density, and a high density preform formed with a bulk density higher than the reference density are used. The reference density preform has a bulk density (first bulk density) of 0.4 g/cm$^3$ or more and 1.0 g/cm³ or less with reinforcing fibers with an average fiber length of 0.5 mm or more, and is set such that the minimum necessary strength may be obtained after resin molding. The high density preform is set to have a bulk density higher than the first bulk density described above, and preferably has a density that is 50% or more and 80% or less of the density of the molded article (resin composition excluding metal portions), for example.

The reference density preform described above can be easily processed into various shapes, and thus can be formed into any shape according to the shape of the molded article. The high density preform can be molded by compressing the formed reference density preform, and thus improving strength. In the reference density preform and the high density preform, resin is dispersed and mixed between reinforcing fibers. In other words, since the reinforcing fibers and the resin are mixed when the preform is one unit, the inside of the reference density preform and the high density preform is entirely and reliably impregnated with the resin during resin molding in the post-process.

It is preferable that the high density preforms are selectively provided in portions of gear box components that require high strength. Accordingly, it is possible to have a high density of reinforcing fibers in portions requiring high strength and a relatively low density in the other regions, and locally adjust the strength of the molded article. As a result, it is possible to accurately provide different required strengths to different portions of the molded article, and it is also possible to reduce the amount of reinforcing fibers blended in portions where strength is not particularly required. It is possible to reduce the weight of the gear box components, and also achieve a structure that has the same durability and reliability as the related-art metal articles. Reinforcing fibers are not wasted, and an economically superior configuration can be achieved.

Compared to the other portions, a greater stress is likely to be generated in the resin composition portions 141 and 142 near the boundaries with the core metals 143, 144, 145, and 146 under the action of external force. Therefore, a configuration may be adopted in which the high density preforms are placed in areas including the boundaries with the core metals 143, 144, 145, and 146 in the resin composition portions 141 and 142, and the reference density preforms are placed in the other areas.

FIGS. 12A and 12B are configuration diagrams of a molded article 80 imitating a gear box cover, in which FIG. 12A is an axial cross-sectional view and FIG. 12B is a plan view.

It is assumed that the molded article 80 includes a shaft portion 80a and a flange portion 80b, and a large stress is generated in the shaft portion 80a. Here, the high density preform is placed in the portion that is the shaft portion 80a of the mold, the reference density preform is placed in the portion that is the flange portion 80b, and molding is performed by supplying resin into the cavity of the mold. The resin supplied into the cavity is preferably the same as the resin dispersed and mixed in the reference density preform and the high density preform, but may be substituted with other resins, or appropriate additives may be mixed therein.

The high density preform and the reference density preform may be placed separately in the cavity, but it is also possible to integrate both preforms in advance to simplify the molding process.

FIGS. 13A, 13B, and 13C are process explanatory diagrams showing a processing process of the integrated preform.

As shown in FIG. 13A, a high density preform 85 is placed in a fixed side mold 83 at a portion corresponding to the shaft portion 80a (FIGS. 12A and 12B), and a reference density preform 87 is placed at a portion corresponding to the flange portion 80b. Then, as shown in FIG. 13B, a movable side mold 89 is moved toward the fixed side mold 83 such that both molds are integrated together to approximate the shape of the molded article, thereby performing compression molding. Here, it is also possible to add and pile up resin to each placed preform and to make the impregnated state of the resin more uniform. Accordingly, as shown in FIG. 13C, an integrated preform 90 in which the high density preform 85 and the reference density preform 87 are integrated in the mold is obtained.

Next, the obtained integrated preform 90 is taken out by opening the fixed side mold 83 and the movable side mold 89. Then, the integrated preform 90 taken out is placed in a cavity of a resin mold (not shown) and resin molded. As a result, the molded article 80 shown in FIGS. 12A and 12B is molded. Accordingly, the high density preform 85 and the reference density preform 87 can be handled integrally, so that handling performance is improved and workability of the molding process can be improved.

The integrated preform 90 may be resin molded without being removed from the fixed side mold 83 and the movable side mold 89 and supplying resin into the cavity in the mold. That is, the mold for forming the integrated preform 90 may be used as the mold for resin molding to simplify the molding process.

As described above, the method for producing the gear box components forming a gear box that houses a gear mechanism includes the following processes.

(1) A process of preparing a reference preform in which reinforcing fibers with an average fiber length of 0.5 mm or more are formed at a first bulk density, and a high density preform in which reinforcing fibers are formed with a second bulk density higher than the first bulk density (for example, 0.4 g/cm³ or more and 1.0 g/cm³ or less).

(2) A process of placing the reference preform and the high density preform in the cavity of the mold.

(3) A process of filling the cavity with resin and resin molding the reference preform and the high density preform together.

The gear box component of the present configuration includes a portion provided with the high density preform and a portion provided with the reference preform, and in the portion provided with the high density preform, the density of reinforcing fibers can be increased compared to the other portions, thereby improving the impact resistance, creep properties, and rigidity of the molded article. It is possible to achieve weight reduction compared to related-art metal gear box components. When molding is performed using only the reference density preform, the reinforcing fibers flow during molding, causing disturbance in the orientation direction, and the strength is likely to decrease. Meanwhile, when molding is performed using the high density preform, since the reinforcing fibers do not flow during molding, the strength of the molded article is increased, but the reinforcing fibers may not be filled at the ends of the product. Therefore, by combining the high density preform and the reference density preform, the reinforcing fibers are filled up to the ends of the molded article with the reference density preform, while the strength of the molded article is maintained with the high density preform, resulting in a configuration in which the reinforcing fibers are dispersed throughout the molded article.

By joining the high density preform to the insert material and disposing the same in the cavity, it is possible to selectively improve the strength of the region including the boundary with the insert material. When a large external force is applied to the portion of the insert material of the molded article, the molded article can be configured with excellent high strength.

The gear box main body 135 and the gear box cover 137 as shown in FIGS. 11A and 11B are produced by insert molding a resin material, using the core metals 143 and 145 of the fastening portion and the core metals 144 and 146 that fit into the first rolling bearing 151 and the second rolling bearing 153 as cores. As a result, the dimensional stability of the molded article is improved.

The fixing strength of both the gear box main body 135 and the gear box cover 137 may be increased. Since the gear box main body 135 and the gear box cover 137 can be fastened together with bolts in the same way as when the gear box components are made of metal, it is possible to implement weight reduction and obtain durability and reliability equivalent to the related-art articles.

In the gear box main body 135 and the gear box cover 137 of the present configuration, when a thermosetting resin material is used as the resin material, the metal core and the inner and outer rings of the rolling bearing can be bonded to each other with sufficient reliability even without having to be subjected to surface roughening treatment. To ensure highly reliable adhesive strength, it is preferable to apply an adhesive to the surface of the core metal and the raceway, that is, to the joint surface. Here, the desired strong adhesive state may be obtained.

According to the method described above, other than the metal core portion, a high strength gear box component is obtained, which is formed by incorporating reinforcing fibers having an average fiber length of 0.5 mm or more in a resin material at a bulk density corresponding to the required strength.

With the method for producing described above, a preform impregnated with a certain amount of resin in advance is placed in the cavity of the mold, and then the resin molding process is performed in which molten resin is injected into the cavity and pressurized. According to the method, a skin layer having a smooth surface and is made of resin that envelops reinforcing fibers is formed on the surface of the molded article. By forming the skin layer, the mechanical strength and dimensional stability of the molded article are improved. The method for producing described above can be suitably used to produce a retainer, for example, and can easily form a guide surface with high strength and high dimensional accuracy.

Hereinbelow, a method for producing a retainer using a high density preform and a reference density preform will be described.

For example, taking the retainer 19 shown in FIG. 2 as an example, it is preferable to apply a high density preform to the annular portion 19A of the retainer 19, and apply a reference density preform to the columnar portions 19B. The specific producing process includes the following processes.

First, according to the shape of the retainer 19, an annular high density preform corresponding to the annular portion 19A and a columnar reference density preform corresponding to the columnar portion 19B are formed by the paper-making process described above. The obtained high density preform is placed in the cavity of the mold at a portion where the annular portion 19A is to be molded, and the reference density preform is placed in the cavity at a portion where the columnar portion 19B is to be molded. After the mold is clamped and heated, molten resin is injected into the cavity. By opening the mold after the molten resin in the cavity is cured, the annular portion 19A including the high density preform and the columnar portion 19B including the reference density preform are integrated to obtain a retainer made of a resin impregnated composite material molded article. A skin layer is formed on the surface of the retainer.

According to the retainer formed as such, the annular portion 19A is formed with high strength and high precision, so that it is suitable as a retainer of an outer ring guide type or an inner ring guide type. Since the columnar portion 19B has more flexibility than the annular portion 19A, it is easier to insert the rolling element (roller) into the pocket.

For the preforms used herein, the high density preform and the low density preform may be separately formed, but it is also possible to form the entire retainer shape with the low density preform first, and then selectively compressing portions corresponding to the annular portion 19A into the high density preform. Here, the portion corresponding to the annular portion 19A may be formed with the low density preform with a larger size considering compression and compressed to a desired size.

The composite material molded article described above is not limited to the retainer, but any cylindrical or annular article can be molded in the same manner as described above. In the case of a molded article having an inner circumferential surface made of a cylindrical surface, a member having an outer circumferential surface of a corresponding shape can be easily fit to the inner circumferential surface of the molded article. For example, a hole into which the outer circumferential surface of the outer ring of the rolling bearing is fit can be formed in the housing with high strength and high precision.

EXAMPLES

The following describes the results of evaluating the strength of the molded article 80 having a shape imitating the gear box cover shown in FIGS. 12A and 12B described above as an example of a gear box component that is a composite material molded article. However, the present disclosure is not limited in any way by the shapes shown in FIGS. 12A and 12B.

Test Example 1

After preparing a high density preform having a shape corresponding to the shaft portion 80a, including a preform formed by paper-making after calculating the composition such that the bulk density of the reinforcing fiber is 1.1 g/cm$^3$, and preparing a reference preform having a shape corresponding to a portion other than the cylindrical portion, including a preform formed by paper-making after calculating the composition such that the bulk density of the reinforcing fiber is 0.6 g/cm$^3$, the preforms were placed in the cavity of the mold, and then a molten resin material was injected into the cavity and press molded together with the preforms to prepare a molded article.

Test Example 2

After preparing a reference preform having a shape corresponding to the molded article, including a preform formed by paper-making after calculating the composition such that the bulk density of the reinforcing fiber is 0.6 g/cm$^3$ and placing the prepared preform in the cavity of the mold, a molten resin material was injected into the cavity and press molded together with the preform. As such, a molded article was prepared.

In Test Examples 1 and 2, carbon fibers with an average fiber length of 5.0 mm were used as reinforcing fibers, and phenol resin was used as the resin material. The high density preform was formed by wrapping the reference density preform around a rod and compressing the preform in the radial direction toward the rod using two half molds obtained by dividing the cylindrical shape into two. The temperature during compression was adjusted to not exceed the curing temperature of the resin. Thereafter, the resin was cured by heating.

From the molded articles of Test Examples 1 and 2, test pieces are cut out from each portion of a plane portion 91 including the upper surface of the flange portion 80b, a side portion 93 including the side surface of the flange portion 80b, and a cylindrical portion 95 on the side surface of the shaft portion 80a shown in FIGS. 14A and 14B, and a bending test was conducted on each test piece. The test results are shown in Table 1. Note that the bending test is a test method based on ISO178 (JIS K7171).

TABLE 1

|  |  | Plane portion | Side portion | Cylindrical portion |
|---|---|---|---|---|
| Bending strength [MPa] | Test Ex. 1 | 440 | 480 | 430 |
|  | Test Ex. 2 | 450 | 430 | 170 |

As shown in Table 1, in Test Example 2, the bending strength of the cylindrical portion 95 was lower than the bending strength of the plane portion 91 and the side portion 93. Meanwhile, in Test Example 1, the result showed that almost the same high bending strength was obtained in all regions of the plane portion 91, the side portion 93, and the cylindrical portion 95. In other words, it was found that with the reference density preform of Test Example 2, the bending strength decreases according to the region of the molded article, but when the high density preform of Test Example 1 was used, high strength could be stably obtained regardless of the region of the molded article.

As described above, the present description discloses the following.

(A1) A method for producing a retainer for use in a rolling bearing, including processes of:
preparing a solution in which reinforcing fibers with an average fiber length of 0.5 mm or more and thermosetting resin are dispersed and mixed in a solvent;
removing the solvent from the dispersed and mixed solution by paper-making to form a preform; and
press molding the obtained preform using a mold set at a temperature equal to or higher than the curing temperature of the thermosetting resin to mold a retainer.

According to the method for producing the retainer, by press molding the preform formed by paper-making to form the retainer, it is possible to maintain a good lubrication condition even when used in a high speed rotation environment, thereby achieving high reliability and long life.

(A2) The method according to (A1), in which the reinforcing fiber is at least one selected from carbon fiber, aramid fiber, glass fiber, cellulose fiber, polyarylate fiber, and polyparaphenylene benzbisoxazal fiber.

According to the method for producing the retainer, the reinforcing properties of the reinforcing fibers can be ensured.

(A3) The method according to (A1) or (A2), in which an amount of the reinforcing fibers in the solution is 10% by mass or more and 60% by mass or less.

According to the method for producing the retainer, the mechanical strength can be significantly improved, and the desired strength and rigidity can be ensured without impairing the toughness of the material.

(A4) The method according to any one of (A1) to (A3), in which the thermosetting resin is at least one selected from epoxy resin, bismaleimide resin, polyaminoamide resin, polyimide resin, and phenol resin.

According to the method for producing the retainer, the retainer can be easily cured by thermosetting treatment.

(A5) The method according to (A4), in which the thermosetting resin is in powder form.

According to the method for producing the retainer, reinforcing fibers and thermosetting resin can be sufficiently dispersed and mixed in the paper-making process.

(A6) The method according to any one of (A1) to (A5), in which the press molding is compression molding from the outside in the radial direction of the retainer.

According to the method for producing the retainer, the preform can be press molded from the radially outer side to the radially inner side.

(A7) A method for producing a rolling bearing, including producing a rolling bearing using the retainer produced by the method for producing the retainer according to any one of (A1) to (A6).

According to the method for producing the rolling bearing, it is possible to improve reliability and achieve a long life while maintaining good lubrication even when the rolling bearing is used in a high speed rotation environment.

(B1) A method for producing a gear box component forming a gear box that houses a gear mechanism, including processes of:
preparing a reference preform in which reinforcing fibers having an average fiber length of 0.5 mm or more are formed at a first bulk density, and a high density preform in which the reinforcing fibers are formed at a second bulk density higher than the first bulk density;
placing the reference preform and the high density preform in a cavity of a mold; and
filling the cavity with resin and resin molding the reference preform and the high density preform together.

According to the method for producing the gear box component, the gear box component including a portion provided with the high density preform and a portion provided with the reference preform is molded.

As a result, the high density preform is placed in a region where particularly high strength is required, such that the density of the reinforcing fibers may increase compared to the other regions. Therefore, excellent properties such as impact resistance, creep properties, rigidity, and dimensional stability can be obtained, and weight reduction can be achieved compared to the gear box component made of metal.

(B2) The method according to (B1), in which the first bulk density is 0.4 g/cm$^3$ or more and 1.0 g/cm$^3$ or less.

According to the method for producing the gear box component, the minimum necessary strength can be maintained.

(B3) The method according to (B1) or (B2), in which the reference preform and the high density preform include the resin mixed between the reinforcing fibers.

According to the method for producing the gear box component, since the resin is mixed in the reference preform and the high density preform in advance, it is possible to reliably impregnate the inside of the preform with the resin.

(B4) The method according to any one of (B1) to (B3), further including a process of integrally compression molding the reference preform and the high density preform before filling the mold with the resin.

According to the method for producing the gear box component, the reference preform and the high density preform are integrated, so the preforms are joined without any gaps, and the reinforcing fibers can be uniformly distributed. When handling the integrated preform, handling performance of the preform can be improved, and the workability of the molding process can be improved. Since the reference preform can be easily processed into various shapes during compression molding, gear boxes with various shapes can be produced.

(B5) The method according to any one of (B1) to (B4), in which the reinforcing fibers include at least one of carbon fibers, glass fibers, and aramid fibers.

According to the method for producing the gear box component, the gear box component can be made into a lightweight and high strength component.

(B6) The method according to any one of (B1) to (B5), in which the resin is either epoxy resin or phenol resin.

According to the method for producing the gear box component, the gear box component can be made into a component with excellent heat resistance and creep properties such as bending and distortion.

(B7) The method according to any one of (B1) to (B6), in which a thermoplastic resin composition containing 10 to 60% by mass of the reinforcing fibers is formed by the resin molding.

According to the method for producing the gear box component, impact resistance, creep properties, rigidity, and dimensional stability can be improved compared to the resin alone.

(B8) The method according to any one of (B1) to (B7), in which the process of placing the high density preform in the cavity includes a process of joining the high density preform to a metal insert material and placing the same.

According to the method for producing the gear box component, the high density preform is provided in contact with the insert material, thereby selectively increasing the density of reinforcing fibers around the insert material, and increasing the strength after molding.

(B9) The method according to any one of (B1) to (B8), in which the gear box component is a component forming a gear box that houses a reduction gear mechanism in an electric power steering device that transfers auxiliary output from an electric motor to a steering mechanism of a vehicle via the reduction gear mechanism.

According to the method for producing the gear box component, it is possible to obtain a gear box for an electric power steering device that is lightweight and has durability and reliability equivalent to those made of metal.

The present disclosure is not limited to the embodiments described above, and combining the components of the embodiments with each other, and modification and application by those skilled in the art according to the description of the specification and well-known techniques are also intended to be included in the scope of the present disclosure. For example, it is also possible to apply the embodiment to a gear device as a composite material molded article.

REFERENCE SIGNS LIST 11 roller bearing (rolling bearing)
19, 29 retainer 19A annular portion
19B columnar portion
19a pocket
21 ball bearing (rolling bearing)
29 retainer
29a pocket
31 reinforcing fiber
33 thermosetting resin
35 solvent
37 container
39 stirrer
41 solution
51 press mold (mold)
53 inner mold
55 outer mold
57 base mold
59 movable mold
59a protrusion
61 clearance portion
63 preform
65 compression molded body
71 press mold (mold)
73 outer mold
73a block
80 molded article
111 electric motor
113 reduction gear mechanism
115 steering mechanism
117 steering shaft
119 steering shaft housing
121 rack and pinion mechanism
123 rack
125 pinion shaft
127 rack housing
129, 131 universal joint
133 gear box
135 gear box main body (gear box component)
137 gear box cover (gear box component)
139 bolt
141, 142 resin composition portion
143, 144, 145, 146, 147, 149 core metal (insert material)
148 intermediate steering shaft
151 first rolling bearing
153 second rolling bearing
155 worm wheel
155a disk portion
155b synthetic resin teeth
157 worm shaft
159 torque sensor
161 rotating shaft
163 spline joint
167 torsion bar
169 connecting pin
173 gear housing
175 third rolling bearing
177 fourth rolling bearing
100 electric power steering device

The invention claimed is:

1. A method for producing a retainer for use in a rolling bearing, the retainer including: a pair of annular portions that face each other in an axial direction; and a plurality of columnar portions that connect the pair of annular portions, rolling elements being housed in regions surrounded by the pair of columnar portions arranged to face each other in a circumferential direction and the pair of annular portions facing each other in the axial direction, the method comprising:

to obtain the columnar portions, from a solution in which reinforcing fibers with an average fiber length of 0.5 mm or more and thermosetting resin are dispersed and mixed in a solvent, removing the solvent by paper-making to form a reference preform in which the reinforcing fibers are formed at a first bulk density;

to obtain the annular portions, from the solution in which the reinforcing fibers and the thermosetting resin are dispersed and mixed in the solvent, removing the solvent by paper-making to form a high density pre-form in which the reinforcing fibers are formed at a second bulk density higher than the first bulk density;

placing the high density preform in a cavity of a mold at a portion where the annular portions to be molded;

placing the reference preform in the cavity at a portion where the columnar portions to be molded; and clamping and heating the mold and injecting a molten resin into the cavity to perform resin molding.

2. The method according to claim 1, wherein the first bulk density is 0.4 g/cm$^3$ or more and 1.0 g/cm$^3$ or less.

3. The method according to claim 1, wherein the thermosetting resin is mixed between the reinforcing fibers in the reference preform and the high density preform.

4. The method according to claim 1, wherein the reinforcing fiber is at least one selected from carbon fiber, aramid fiber, glass fiber, cellulose fiber, polyarylate fiber, and polyparaphenylene benzbisoxazal fiber.

5. The method according to claim 1, when the retainer is molded, thermoplastic resin, containing the reinforcing fibers in an amount of 10% by mass or more and 60% by mass or less, is formed.

6. The method according to claim 1, wherein the thermosetting resin is at least one selected from epoxy resin, bismaleimide resin, polyaminoamide resin, polyimide resin, and phenol resin.

7. The method according to claim 1, wherein the thermosetting resin is in powder form.

8. A method for producing a rolling bearing, comprising producing a rolling bearing using the retainer produced by the method according to claim 7.

* * * * *